(12) United States Patent
Li et al.

(10) Patent No.: US 8,591,020 B2
(45) Date of Patent: *Nov. 26, 2013

(54) AQUEOUS INK JET INK COMPRISING A CROSSLINKING PIGMENT DISPERSION BASED ON DIBLOCK POLYMERIC DISPERSANTS

(75) Inventors: Xiaoqing Li, Newark, DE (US); C. Chad Roberts, Hockessin, DE (US); Patrick F. McIntyre, West Chester, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/379,132

(22) PCT Filed: Jul. 14, 2010

(86) PCT No.: PCT/US2010/041912
§ 371 (c)(1),
(2), (4) Date: Dec. 19, 2011

(87) PCT Pub. No.: WO2011/008813
PCT Pub. Date: Jan. 20, 2011

(65) Prior Publication Data
US 2012/0105558 A1    May 3, 2012

Related U.S. Application Data

(60) Provisional application No. 61/225,741, filed on Jul. 15, 2009.

(51) Int. Cl.
*C09D 11/00* (2006.01)

(52) U.S. Cl.
USPC .................................................. 347/100

(58) Field of Classification Search
USPC .................................................. 347/100
See application file for complete search history.

(56) References Cited

U.S. PATENT DOCUMENTS

| | | | |
|---|---|---|---|
| 4,490,728 A | 12/1984 | Vaught et al. | |
| 5,085,698 A * | 2/1992 | Ma et al. | 524/388 |
| 5,519,085 A | 5/1996 | Ma et al. | 524/503 |
| 5,852,075 A | 12/1998 | Held | 523/161 |
| 5,859,113 A | 1/1999 | McIntyre et al. | 524/460 |
| 6,051,645 A | 4/2000 | Suzuki et al. | 524/500 |
| 6,161,918 A | 12/2000 | Bailey et al. | 347/40 |
| 6,262,152 B1 * | 7/2001 | Fryd et al. | 524/90 |
| 6,648,463 B2 | 11/2003 | Koga et al. | 347/100 |
| 2003/0184629 A1 | 10/2003 | Valentini et al. | 347/100 |
| 2004/0048973 A1 | 3/2004 | Akutsu et al. | 524/543 |
| 2004/0197357 A1 | 10/2004 | Heming et al. | 424/401 |
| 2005/0090599 A1 | 4/2005 | Spinelli | 524/543 |
| 2009/0311425 A1 | 12/2009 | Tsubaki et al. | 427/256 |
| 2011/0199420 A1 * | 8/2011 | Roberts et al. | 347/20 |
| 2012/0098910 A1 * | 4/2012 | Li et al. | 347/95 |
| 2012/0101217 A1 * | 4/2012 | Li et al. | 524/558 |
| 2012/0105558 A1 | 5/2012 | Li et al. | 347/100 |

FOREIGN PATENT DOCUMENTS

| | | |
|---|---|---|
| EP | 0 851 010 A1 | 7/1998 |
| EP | 1 167 470 A1 | 1/2002 |
| JP | 2006-312724 A1 | 11/2006 |
| WO | WO 00/20520 A1 | 4/2000 |
| WO | WO 2004/104119 A1 | 12/2004 |
| WO | WO 2006/064193 A1 | 6/2006 |
| WO | WO 2006/107112 A1 | 10/2006 |
| WO | WO 2006/138311 A1 | 12/2006 |

OTHER PUBLICATIONS

ISR and WO of the ISA in PCT/US2010/041912, PCT counterpart of the present application, European Patent Office, Rijswijk, NL, Damiano Vizzini, Authorized Officer [ISR] and Volker Schmitz, Authorized Officer [WO of the ISA], Aug. 26, 2010.
Wojciech Zeslawski, Authorized Officer, Written Opinion of the International Searching Authority, in WO 2010/059939, PCT/US2009/065330, PCT counterpart of copending U.S. Appl. No. 13/125,599, European Patent Office, Munich DE, May 20, 2011.
Damiano Vizzini, Authorized Officer, International Search Report and Written Opinion, in WO 2011/008810, PCT/US2010/041904, PCT counterpart of copending U.S. Appl. No. 13/379,121, European Patent Office, Riswijk NL, Nov. 5, 2010.
Damiano Vizzini, Authorized Officer, International Search Report and Written Opinion, in WO 2011/008820, PCT/US2010/041921, PCT counterpart of copending U.S. Appl. No. 13/379,141, European Patent Office, Riswijk NL, Aug. 31, 2010.

* cited by examiner

*Primary Examiner* — Laura Martin
(74) *Attorney, Agent, or Firm* — John H. Lamming; Simon L. Xu

(57) ABSTRACT

The present disclosure provides an aqueous ink jet ink comprising an ink vehicle and an aqueous dispersion, wherein the aqueous dispersion comprises a solid particle and a polymeric dispersant that has been crosslinked, wherein the polymeric dispersant is a block copolymer comprising an A block and a B block, wherein the A block is a segment having a block size of about 5 to about 18 units, and comprises at least 50% by weight of a monomer, having the following structure: $CH_2=CRC(O)O(CHR_1CH_2O)nR_2$; wherein R and $R_1$ are H, or methyl; $R_2$ is alkyl of 1-4 carbon atoms or phenyl; and n is about 1 about 20; and the B block is a segment comprising an ionic monomer and at least one hydrophobic monomer; and wherein the dispersant comprises a crosslinkable moiety; wherein the crosslinkable moiety is crosslinked with a crosslinking agent selected from the group consisting of epoxide, carbodiimide, oxazoline, isocyanate, and silane; and wherein the aqueous dispersion has a pH of at least about 8.0. The disclosure further pertains to a printer comprising the aqueous ink jet ink of this disclosure that provides images with the requisite optical density and chroma needed for emerging ink jet applications.

20 Claims, No Drawings

AQUEOUS INK JET INK COMPRISING A CROSSLINKING PIGMENT DISPERSION BASED ON DIBLOCK POLYMERIC DISPERSANTS

BACKGROUND OF THE DISCLOSURE

This disclosure relates to novel, stable aqueous dispersions of solid particles, the crosslinked polymeric dispersants that produce the stable aqueous particle dispersions, the process of making the same and the use thereof in ink jet inks. These dispersants enable a unique combination of ionic and steric stabilization. In water, they provide only ionic stabilization with a random ionic block, but with the addition of ink vehicle components, these dispersants facilitate entropic repulsion and steric stabilization with an ink vehicle soluble block. Furthermore, these dispersants comprising crosslinkable moieties are crosslinked with a crosslinking compound such that the particles are dispersed in a crosslinked polymer matrix.

Aqueous dispersions of solid particles are known in the art and have been used in various applications such as, for example, inks for printing (particularly ink jet printing); waterborne paints and other coating formulations for vehicles, buildings, road markings and the like; cosmetics; pharmaceutical preparations; etc. For examples, pigment particles are typically not soluble in an aqueous ink vehicle; it is often required to use dispersing agents, such as polymeric dispersants or surfactants, to produce a stable dispersion of the pigment in the ink vehicle.

An application of the present disclosure relates to an ink (printing liquid) useful for writing utensils such as aqueous ball point pens, fountain pens and felt-tip pens; continuous and on-demand type inkjet printers of a thermal jet type, a piezo type and the like; and an inkjet printing method employing the ink.

Aqueous particle dispersions generally are stabilized by either a non-ionic or ionic technique. When the non-ionic technique is used, a polymer having a non-ionic hydrophilic section that extends into the water medium is typically employed. The hydrophilic section provides entropic or steric stabilization that stabilizes the solid particles in the aqueous ink vehicle. Polyvinyl alcohol, cellulosics, ethylene oxide modified phenols and ethylene oxide/propylene oxide polymers may be used for this purpose.

While the non-ionic technique is not sensitive to pH changes or ionic contamination, it has a major disadvantage in that the printed image is water sensitive. Thus, non-ionic content should be minimized to ensure durability.

In the ionic technique, the solid particles are stabilized using the polymer of an ion containing monomer, such as neutralized acrylic, maleic or vinyl sulfonic acid. The polymer provides stabilization through a charged double layer mechanism whereby ionic repulsion hinders the particles from flocculation. Since the neutralizing component tends to evaporate after printing, the polymer then has reduced water solubility and the printed image is not water sensitive.

There has been effort in the art directed at improving the stability of the dispersions so that the particles are less likely to settle out of the vehicle under defined set of conditions. The effort to improve dispersion stability to date has included improvements in the processes used to make the dispersions, the development of new dispersants and the exploration of the interaction between dispersants and particle, and between dispersants and aqueous vehicle. While much of the effort has general application at improving dispersion stability, some of that effort has not found utility in particular applications. For example, the pigment dispersions used in ink jet printing applications have very unique and demanding requirements. It is critical that ink components comprising the pigment dispersion remain stable, not only in storage but also over repeated jetting cycles.

There continues to be a need for highly stable, higher-quality and different property inks for inkjet ink applications. Although improvements in polymeric dispersants have significantly contributed to improved inkjet inks, the current dispersants still do not provide inks with requisite stability, optical density and chroma needed for emerging ink jet applications.

SUMMARY OF THE DISCLOSURE

In a first aspect, the disclosure provides an aqueous ink jet ink comprising an ink vehicle and an aqueous dispersion, wherein the aqueous dispersion comprises a solid particle and a polymeric dispersant that has been crosslinked, wherein the polymeric dispersant is a block copolymer comprising an A block and a B block, wherein the A block is a segment having a block size of about 5 to about 18 units, and comprises at least 50% by weight of a monomer, having the following structure:

$CH_2=CRC(O)O(CHR_1CH_2O)nR_2$ wherein R and $R_1$ are H, or methyl;
$R_2$ is alkyl of 1-4 carbon atoms or phenyl; and
n is about 1 about 20; and the B block is a segment comprising an ionic monomer and at least one hydrophobic monomer; and wherein the dispersant comprises a crosslinkable moiety; wherein the crosslinkable moiety is crosslinked with a crosslinking agent selected from the group consisting of epoxide, carbodiimide, oxazoline, isocyanate, and silane; and wherein the aqueous dispersion has a pH of at least about 8.0, more typically about 8.0 to about 12.0, and most typically about 8.0 to about 11.0.

Typically the solid particle is selected from the group consisting of a colorant such as pigment or insoluble dye, fillers such as silica, metallic particles, biologically active compounds, pharmaceutically active compounds, polymer particles and hollow glass spheres.

DETAILED DESCRIPTION OF THE DISCLOSURE

The aqueous dispersions of this disclosure comprise a solid particle and a crosslinked polymeric dispersant. Further the ink jet inks comprise an ink vehicle and the aqueous dispersions. These inks provide images with the requisite stability, optical density and chroma needed for emerging ink jet applications.

Aqueous Dispersions:
Solid Particle:

Although solid particles are required for the disclosure, the type and composition of the solid particle is not particularly critical and will largely depend upon the ultimate end use application of the aqueous dispersion. By definition, the solid particle is at least substantially insoluble in the liquid vehicle, typically water. Apart from that general limitation, the solid particle may be organic, inorganic or mixtures thereof. Some examples of suitable solid particles include colorants such as pigments and insoluble dyes, fillers such as silica, metallic particles, biologically active compounds, pharmaceutically active compounds, polymer particles, hollow glass spheres, etc.

A wide variety of organic and inorganic pigments, alone or in combination, may be selected to make the aqueous dispersion and ink jet ink. The term "pigment" as used herein means an insoluble colorant. The pigment particles are sufficiently small to permit free flow of the ink through the ink jet printing device, especially at the ejecting nozzles that usually have a diameter ranging from about 10 micron to about 50 micron. The particle size also has an influence on the aqueous dispersion stability, which is critical throughout the life of the ink jet ink. Brownian motion of minute particles will help prevent the particles from flocculation. It is also desirable to use small particles for maximum color strength and gloss. The range of useful particle sizes is typically about 0.005 micron to about 15 micron. Typically, the pigment particle size is in the range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in U.S. Pat. No. 5,085,698, incorporated herein by reference.

Some examples of pigments with coloristic properties useful in ink jet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. Colorants are referred to herein by their "C.I" designation established by Society Dyers and Colourists, Bradford, Yorkshire, UK and published in The Color Index, Third Edition, 1971. Commercial sources of pigment are generally well known in the art.

In the case of organic pigments, the ink jet ink may contain up to approximately 30% pigment by weight, typically about 0.1 to about 25% pigment by weight, and more typically about 0.25 to about 10% pigment by weight, based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

Polymeric Dispersant:

The function of the polymeric dispersant is to disperse the solid particle, more typically a colorant, in the aqueous vehicle. In accordance with the disclosure, the polymeric dispersant is an AB block copolymer with crosslinkable functional moieties that are crosslinked with crosslinking agents selected from the group consisting of epoxide, carbodiimide, oxazoline, isocyanate, and silane. These block copolymers may comprise an A block that is soluble in the ink vehicle components such as glycols and butyl carbitol, and a B block comprising a random segment of ionic/potentially ionic and hydrophobic monomers. By 'potentially ionic' it is meant a monomer which may be neutralized to become ionic such as methacrylic acid (MAA). MAA may be neutralized with KOH to become an ionic monomer unit. The number of units in the A block can be about 5 to about 18, more typically about 6 to about 12, still more typically about 8 to about 12, and most typically about 8 units. The number of units in the B block can be about 15 units to about 80 units, more typically about 25 units to about 70 units and most typically about 30 units to about 50 units. Typically, the B block provides ionic stabilization whereas the A block provides steric stabilization in the ink vehicle. These dispersants provide excellent image properties (O.D. and durability) while facilitating robust ink formulations and pragmatic dispersion processes.

Pigments are insoluble particles in the ink vehicle and must be treated in order to form a stable dispersion. The pigments are first dispersed in the aqueous vehicle by a block copolymer dispersant having two blocks (or segments), an A block and a B block. The A block, is an ink vehicle soluble segment of the polymer which provides some steric stabilization in the ink vehicle while also enhancing the surface-activity of the dispersant. The B block is a random segment comprising ionic/potentially-ionic monomers and hydrophobic monomers providing pigment anchoring. The overall polymeric dispersant has a number average molecular weight (Mn) of about 2,000 to about 20,000 Daltons, more typically about 4,000 to about 12,000 Daltons, and an acid number of about 40 to about 220 (mg KOH/g polymer solids) more typically about 50 to about 150 (mg KOH/g polymer solids). The weight ratio of pigment to dispersion (P/D) is typically between about 0.5 and 5. To further form a stable dispersion of the pigment with the crosslinked polymer matrix, a crosslinking compound is then mixed with the dispersion. The polymeric dispersant with crosslinkable moiety undergoes a crosslinking reaction and forms a crosslinked network to entrap the pigment suspended in aqueous vehicle; wherein the aqueous dispersion has a pH of at least about 8.0.

The print properties of the inks are especially enhanced in the presence of metal salts, for example calcium carbonate/chloride treated papers (ColorLok) and underprinting with salt latent inks such as magnesium nitrate cyan inks.

A Block Composition:

The function of the A Block is to provide steric stabilization in the ink vehicle leading to stability of the dispersion in the presence of organic components which can be in the ink vehicle that is also known as the aqueous carrier medium. Organic components often contribute to flocculation of aqueous pigment dispersions. When the A block of an AB diblock dispersant has good solubility in the organic components, resistance to flocculation can be markedly improved through the extension of the A block out from the pigment surface in the ink vehicle leading to entropic repulsion/steric stabilization. Furthermore, typical A block monomers can be nonionic, hydrophilic and increase surface-activity of the dispersant.

The constituent monomer(s) of the A block can be hydrophilic or hydrophobic depending on the properties of the organic components, and they may include monomers which are constituents of the B block. Structural similarity between the A block and the organic components in the ink vehicle will generally result in good compatibility and steric stabilization.

The A block comprises at least 50% by weight of a monomer, having the following structure:

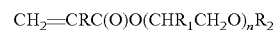

wherein R and $R_1$ are H, or methyl;
  $R_2$ is alkyl of 1-4 carbon atoms or phenyl; and
  n is about 1 to about 20, more typically about 1 to about 10.

Depending on the number, n, of oxyethylene units, the polymers can be just hydrophilic but water insoluble to completely water soluble. The solubility of the polymer increases as the number of oxyethylene units increases. Typical monomers for the A block can be ethoxy triethylene glycol methacrylate, n-butoxyethyl methacrylate and mixtures thereof. The A block can also function to improve polymer properties even in the absence of organic cosolvents It has been found that n-butoxyethyl methacrylate has good compatibility with butyl cellosolve or butyl carbitol, and ethoxy triethylene glycol methacrylate has good compatibility with glycols such as ethylene glycol, diethylene glycol, and tripropylene glycol. In addition, propoxylated methacrylates are soluble in propylene glycols whereas poly(ethoxytriethylene glycol)methacrylate has good compatibility with poly(ethylene oxide) as well as water.

The A block can also contain other monomers that may or may not have crosslinkable moieties, that are present in amounts of less than 50% by weight, and that can be similar to constituents of the B block. Examples of other monomers that can be incorporated in the A block include hydroxyethylmethacrylate, methyl methacrylate, methacrylic acid, butyl methacrylate, and 2-dimethylaminoethyl methacrylate. These monomers can be advantageously used in the A block to have crosslinkable functional moieties for further crosslinking or to adjust the physical properties, e.g., Tg, of the polymeric dispersant of this disclosure while maintaining the compatibility with an aqueous dispersion system. However, by the nature of this disclosure, the A block should have minimal interaction with the pigment, and thus, strongly anchoring monomer units, such as styrene, substituted styrene benzyl methacrylate, phenoxyethyl acrylate, are not desirable.

+B block Composition:

The B block of the AB block copolymer dispersant comprises ionic/potentially ionic monomers and hydrophobic monomers. The ratio of the ionic/potentially ionic monomers and hydrophobic monomer can be about 15 to about 80, more typically about 25 to about 70, and most typically about 30 to about 50. The hydrophobicity of the B block in the AB block copolymer dispersants can be derived from the hydrophobic monomer, $R_3R_4C=R_5X$ wherein each of $R_3$-$R_5$ are independently selected from the group consisting of H and an alkyl, aryl or alkylaryl group having 1-20 carbons, and wherein X is described below. In one preferred embodiment, each of $R_3$-$R_5$ can be selected from the group consisting of H and $CH_3$. In another preferred embodiment, $R_3$ and $R_4$ can be H, and $R_5$ can independently be selected from H and $CH_3$.

In a typical embodiment, X is selected from the group consisting of:
(a) an alkyl, aryl and alkylaryl group containing 1-20 carbon atoms, which group may further contain one or more heteroatoms such as O, N, P, S, Si;
(b) a group of the formula $C(O)OR_6$, wherein $R_6$ is selected from the group consisting of an alkyl, aryl and alkylaryl group containing 1-20 carbon atoms, which group may further contain one or more heteroatoms such as O, N, P, S, Si; and
(c) a group of the formula $C(O)NR_7R_8$, wherein each of $R_7$ and $R_8$ is independently selected from the group consisting of H and an alkyl, aryl and alkylaryl group containing 1-20 carbon atoms, which group may further contain one or more heteroatoms such as O, N, P, S, Si.

Typical hydrophobic monomers in general include, for example, benzyl methacrylate, butyl methacrylate, methyl methacrylate, ethyl methacrylate, propyl methacrylate, hexyl methacrylate, 2-ethylhexyl methacrylate, octyl methacrylate, lauryl ethacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, acrylonitrile, glycidyl acrylate, p-tolyl acrylate, sorbyl acrylate, styrene, alpha-methyl styrene, substituted styrenes, N-alkyl acrylamides, N-alkyl methacrylamides, vinyl acetate, vinyl butyrate and vinyl benzoate.

The ionic character of the AB block copolymer dispersant is derived from the ionic monomer, $R_9R_{10}C=R_{11}Z$ wherein each of $R_9$-$R_{11}$ are independently selected from the group consisting of H and an alkyl, aryl or alkylaryl group having 1-20 carbons, and wherein Z, ionic or a potentially ionic moiety, is described below. In one preferred embodiment, each of $R_9$-$R_{11}$ is selected from the group consisting of H and $CH_3$. In another preferred embodiment, $R_9$ and $R_{10}$ is H, and $R_{11}$ is independently selected from H and $CH_3$.

The Z group can be anionic, cationic, amphoteric or zwitterionic. Some examples of the Z group include anionic groups selected from the group consisting of sulfonates, sulfate, sulfosuccinate, carboxylate, and phosphate; cationic groups such as amine salts, including quaternary amine salts; amphoteric groups; and zwitterionic groups selected from the group consisting of betaine, +N—C—CO2-, and lecithin. The hydrophilic monomers may have single Z substituents or combinations of Z groups. The Z group is present as its hydrogen substituted form or as a salt.

Typical ionic monomers include, for example, methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate, vinyl pyrridine, N-vinyl pyrridine, and 2-acrylamido-2-propane sulfonic acid.

Examples of polymerization methods include but are not limited to free radical processes, Group Transfer Processes (GTP), radical addition fragmentation (RAFT), atom transfer reaction (ATR), and the like.

The overall polymeric dispersant can have a number average molecular weight (Mn) of about 2,000 to about 20,000 Daltons, more typically about 4,000 to about 12,000 Daltons, and an acid number of about 40 to about 220 (mg KOH/g polymer solids), more typically of about 50 to about 150. The weight ratio of pigment to dispersion (P/D) can be typically between about 0.5 and about 5.

The crosslinked polymeric dispersant can be typically present in the amount of about 0.1 to about 20% by weight, more typically in the range of about 0.2 to about 10% by weight, and still more typically in the range of about 0.25% to about 5% by weight, based on the total weight of the ink jet ink.

Crosslinked Polymeric Dispersant

Furthermore, the polymeric dispersants can have crosslinkable functional moieties which may be in the A block or B block. The dispersant is thus capable of crosslinking to a crosslinking compound that has crosslinking functionality reactive with crosslinkable moieties. Table 1 identifies suitable functional groups that may be incorporated into the A block or B block of the polymeric dispersant and the companion crosslinking groups that may be present in the crosslinking compound.

| Crosslinkable moieties | Crosslinking group |
|---|---|
| Acid | Epoxide, carbodiimide, oxazoline |
| Hydroxyl | Epoxide, silane, isocyanate |

As noted above, the functional moieties can be incorporated into the A block or B block of the polymeric dispersant by selection of appropriate monomers. Mixtures of these crosslinking moieties may also be present in the polymeric dispersant. A separate crosslinking compound having the appropriate group can be added to the dispersion to crosslink the polymeric dispersant. Useful crosslinking compounds are those which are soluble or insoluble in the aqueous vehicle, including m-tetramethylxylene diiscyanate (TMXDI), isophorone diisocyanate (IPDI), trimethylopropane polyglycidyl ether, polyglycerol polyglycidyl ether, oxazoline-functional polymers, waterborne polycarbodiimide resin, and silane. After the completion of the crosslinking, pH of the crosslinked dispersion can be adjusted to at least about 8.0, more typically about 8.0 to 12.0, and most typically about 8.0 to about 11.0.

Preparation of Solid Particle Dispersion and Crosslinking of the Dispersants

The dispersions of the present disclosure may be prepared using any conventional milling process known in the art. Most milling processes use a two-step process involving a first mixing step followed by a second grinding step. The first step comprises the mixing of all the ingredients, i.e., particle, dispersant(s), liquid carrier(s), pH adjuster and any optional additives, to provide a blended "premix". Typically all liquid ingredients are added first, followed by the dispersant(s) and lastly the solid particle. Mixing is generally done in a stirred mixing vessel and High Speed Dispersers, (HSD), are particularly suitable for the mixing step. A Cowels type blade attached to the HSD and operated at 500 rpm to 4000 rpm, and typically 2000 rpm to 3500 rpm, provides optimal shear to achieve desired mixing. Adequate mixing is usually achieved by mixing for about 15 minutes to about 120 minutes.

The second step comprises milling of the premix to produce a stable dispersion. A typical milling process for carbon black pigments that avoids media contamination is the Microfluidizer Process, although other milling techniques can be used. In a specific embodiment, a labscale model M-110Y High Pressure Pneumatic, Microfluidizer with a diamond Z-Chamber from Microfluidics of Newton, Mass. can be used. The Microfluidizer uses an impingement process at high pressures to deaggomerate and mill fine particles, such as pigments. The model M-110Y Microfluidizer can operate at pressure ranges of about 3,000 to about 23,000 psi, although pressures of about 10,000 to about 15,000 are typical. The flow rates through the microfluidizer were typically about 200 to about 500 ml/min. and more typically about 300 to about 450 ml/min.

The milling can be done using a staged procedure in which a fraction of the solvent may be held out of the grind and added after milling is completed. This amount of solvent held out during milling can vary by dispersion and is typically about 100 to about 300 grams of the total 600 gram batch size. This can be done to achieve optimal rheology and viscosity for grinding efficiency. Each dispersion can be processed for a total of 10 passes through the mill although the endpoint can be achieved in less milling time.

After completion of milling process, dispersant crosslinking then takes place by adding the crosslinking compound to the particle dispersion. To facilitate the crosslinking reaction, it may be desirable to add a catalyst and/or to elevate the temperature of the mixture. Useful catalysts can be those that are either soluble or insoluble in the liquid and can be selected depending upon the crosslinking reactions. Some suitable catalysts include dibutyltin dilaurate (DBTDL), tributyl amine ("TBA") and dimethyldodecyl amine. After completion of the crosslinking, pH of the crosslinked dispersion can be adjusted to at least about 8.0, more typically about 8.0 to 12.0, and most typically about 8.0 to about 11.0, if needed. Then the dispersion can be filled into a polyethylene container. Optionally, the dispersion can be further processed using conventional filtration procedures known in the art. The dispersions can be processed using ultrafiltration techniques to remove co-solvent(s) and other contaminants, ions or impurities from the dispersion. Each dispersion can be then tested for pH, conductivity, viscosity and particle size. Dispersion stability is deemed important to demonstrating the utility of the dispersing resins. Dispersion stability testing included measuring pH, conductivity, viscosity and particle size after oven aging of samples for 1 week at 70° C. and noting if significant change versus initial readings had occurred.

Pigmented dispersions can be prepared using the pigment identified earlier. The premix can be prepared at typically 23% pigment loading and the dispersant level was set at a P/D (pigment/dispersant), most typically at a P/D of 2.5. A P/D of 2.5 corresponds to a 40% dispersant level on pigment The dispersant resins can be neutralized with either alkali metal hydroxide such as LiOH, KOH, NaOH, or amine to facilitate solubility and dissolution into water. The neutralization process can be done either in situ during the premix stage or by pre-neutralizing the resin during the final stage of manufacture.

During the premix stage the pigment level can be maintained at about 18% to about 30%, more typically about 23%, and was reduced to about 12% to about 18%, more typically about 15% during the milling stage by adding deionized water for optimal milling conditions. After completing the milling process, the dispersions can be reduced to about 10% pigment concentration by adding the de-ionized water and then crosslinked with additional crosslinking compound by thorough mixing at room temperature or elevated temperature for several hours. Next, the treated dispersion can be filtered through a filter, for example, a 0.3 micron Chipwich filter, available from Pall Trincor of East Falls, N.Y., to remove any possible contaminants and placed in a 1000 ml polyethylene container.

Ink Vehicle

The pigmented ink of this disclosure comprises an ink vehicle typically an aqueous ink vehicle, also known as an aqueous carrier medium, the aqueous dispersion and optionally other ingredients.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3- dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from about 30% water/about 70% diethylene glycol to about 95% water/about 5% diethylene glycol. The more typical ratios are about 60% water/about 40% diethylene glycol to about 95% water/about 5% diethylene glycol. Percentages are based on the total weight of the ink vehicle. A mixture of water and butyl carbitol is also an effective ink vehicle.

The amount of ink vehicle in the ink is typically in the range of about 70% to about 99.8%, and more typically about 80% to about 99.8%, based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are typical. 1,2-C4-6 alkanediols, are more typical, 1,2-hexanediol, is most typical. Some suitable surfactants include ethoxylated acetylene diols (e.g. Surfynol® series from Air Products), ethoxylated alkyl primary alcohols e.g. Neodol® series from Shell) and alkyl secondary alcohols (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added should be properly determined, but it is typically in the range of from about 1 to about 15% by weight, and more typically about 2 to about 10% by weight, based on the total weight of the ink. Surfactants may be used, typically in the amount of about 0.01 to about 5% and typically about 0.2 to about 2%, based on the total weight of the ink.

Biocides may be used to inhibit growth of microorganisms.

Pigmented ink jet inks typically have a surface tension in the range of about 20 mN.m$^{-1}$ to about 70 mN.m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even, advantageously, less than about 3.5 mPa·s.

Method of Printing:

A typical printer will generally comprise at least four differently colored inks such as a cyan, magenta, yellow and black (CMYK) ink. Ink sets may further comprise one or more "gamut-expanding" inks, including different colored inks such as an orange ink, a green ink, a violet ink, a red ink and/or a blue ink, and combinations of full strength and light strengths inks such as light cyan and light magenta. In addition, ink sets may include one or more colorless inks which are printed in combination with the colored inks to enhance properties such as optical density, chroma, durability and/or gloss.

According to one embodiment of the disclosure, a method of ink jet printing onto a substrate is provided comprising, in any workable order, the steps of:

(a) providing an ink jet printer that is responsive to digital data signals;

(b) loading the printer with a substrate to be printed;

(c) loading the printer with an aqueous ink jet ink comprising an ink vehicle and an aqueous dispersion, wherein the aqueous dispersion comprises a colorant and a crosslinked polymeric dispersant, wherein the polymeric dispersant is a block copolymer comprising an A block and a B block, wherein the A block is a segment having a block size of about 5 to about 18 units, and comprises at least 50% by weight of a monomer, having the following structure:

$$CH_2=CRC(O)O(CHR_1CH_2O)nR_2$$

wherein R and $R_1$ are H, or methyl;

$R_2$ is alkyl of 1-4 carbon atoms or phenyl; and n is about 1 about 20; and the B block is a segment comprising an ionic monomer and at least one hydrophobic monomer; and wherein the dispersant comprises a crosslinking moiety; wherein the crosslinking moiety is crosslinked with a crosslinking agent selected from the group consisting of epoxide, carbodiimide, oxazoline, isocyanate, and silane; and wherein the aqueous dispersion has a pH of at least about 8.0; and (d) printing onto the substrate using the aqueous ink jet ink, in response to the digital data signals to form a printed image on the substrate.

The inks of the present disclosure can be printed with any suitable inkjet printer, including printers equipped with piezo or thermal print heads. Some examples of thermal ink jet print heads are the Hewlett Packard Deskjet, and Canon iPIXMA iP4200, and some examples of piezo print heads are Brother MFC3360C, and Epson Stylus C120. Some suitable print heads are disclosed in U.S. Pat. No. 6,161,918, U.S. Pat. No. 4,490,728, and U.S. Pat. No. 6,648,463, the disclosures of which are incorporated herein by reference. The substrate can be any suitable substrate including plain paper, such as common electrophotographic copier paper; treated paper, such as photo-quality inkjet paper. The present disclosure is particularly advantageous for printing on plain paper.

The following examples illustrate the disclosure without, however, being limited thereto.

EXAMPLES

In the following examples, unless otherwise stated, water was deionized and ingredient amounts were in weight percent of the total weight of ink.

Glossary:

Crosslinking Compounds from Nagase Chemicals Ltd. (Osaka, Japan):
  Denacol® 321: Trimethylolpropane Polyglycidyl Ether
  Denacol® 920: Polypropylene Glycol Diglycidyl Ether,
  Denacol® 512: Polyglycerol Polyglycidyl Ether Polymeric Dispersants:

The dispersant polymers used to make the dispersions were synthesized by established methods as described, for example, in U.S. Pat. Nos. 5,085,698. and 5,852,075 along with U.S. patent publication US200510090599, the disclosures of which are incorporated by reference herein as if fully set forth.

It should be noted that, in referring to the polymer compositions, a double slash indicates a separation between blocks and a single slash indicates a random copolymer. Thus, BzMA//MAA//BzMA 8//10//8 is an ABA triblock polymer with a first A block that is on average 8 BzMA (Benzyl Methacrylate) units long, a B block that is on average 10 MAA (Methacrylic Acid) units long, and a final A block that is on average 8 BZMA units long.

The following synthetic examples were all based on group transfer polymerization (GTP), although other types of polymerization processes can be used to generate similar types of polymers. In the case of the block polymers, the current block was at least 95% converted before adding the mixture of monomers for the next block. In all cases, the feed cycle strategy is described. However, the synthesis was terminated when 99% of the monomer was converted as detected by HPLC with mesitylene as an internal standard. The molecular weight reported (unless otherwise noted) was based on theoretical considerations. For the random linear polymers, all monomer ratios were reported as the mole ratios of the monomer components, and represented the theoretical degree of polymerization for each block or set of monomer units. Polymeric dispersants were routinely synthesized in dry THF and converted to a solution in 2-pyrrolidone (2P) by distilling the THF while replacing with 2P.

Standard laboratory techniques for handling water sensitive chemicals were employed for the following examples. For example, glassware was extensively dried before use, monomers were stored over sieves, and cannulation procedures were used to keep material dry.

Gel Permeation Chromatography or GPC was used to verify predicted molecular weight and molecular weight distribution. The GPC system included a Waters 1515 Isocratic HPLC Pump, Waters 2414 Refractive Index Detector, 717 plus Waters Autosampler, Four Styregel Columns (HR 0.5, HR 1, HR 2, and HR 4) in series in a Waters Column Heater set to 40° C. Samples were eluted with Tetrahydrofuran (THF) at a flow rate of 1 mL/min. The samples were analyzed using Breeze 3.30 Software with a calibration curve developed from narrow molecular weight, polymethylmethacrylate (PMMA) standards. Based on light scattering data from Polymer Laboratories Ltd., the nominal, peak molecular weight for the PMMA standards were as follows: 300000, 150000, 60000, 30000, 13000, 6000, 2000, and 1000.

The particle size was determined by dynamic light scattering using a Microtrac Analyzer, Largo Fla. For many of the dispersion steps, a Model 100 F or Y, Microfluidics System was used (Newton Mass.).

The polymeric dispersants are summarized in the table below. Details include dispersant # from cross-referencing with ink and pigment dispersion data, polymer structure in terms of DP or chain length for each monomer unit, architecture (diblock vs random), theoretical number average molecular weight (Mn), and theoretical acid number (mg KOH/g solids). The measured acid number and Mn by GPC are included in the polymer preparation. Note, the polymer composition may also be expressed in terms of weight % for each monomer component. However, in an effort to facilitate comparison between random and block copolymer, these polymer structure are represented in the detailed fashion of monomer unit DP.

TABLE 1

| Dispersant # | Polymer Structure (DP) | Architecture | Theor. Mn | Theor. Acid # |
|---|---|---|---|---|
| Dispersant 1 | 8ETEGMA//30BzMA/11MAA | Diblock | 7720 | 81 |
| Dispersant 2 | 8ETEGMA//30BMA/11MAA | Diblock | 7260 | 93 |
| Dispersant 3 | 8ETEGMA//49BzMA/20MAA | Diblock | 11838 | 95 |
| Comp Dispersant 1 | 22BzMA/11MAA | Random | 4818 | 137 |
| Comp Dispersant 2 | 13BzMA//10MAA | Diblock | 3148 | 190 |

Dispersant 1: Diblock 8ETEGMA//30BzMA/11MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 2777 g, was cannulated to the flask. Initiator (1,1-bis(trimethylsilyloxy)-2-methyl propene, 120.9 g (0.521 moles)) was injected followed by catalyst (tetrabutyl ammonium m-chlorobenzoate, 3.13 ml of a 1.0 M solution in acetonitrile). Catalyst solution (tetrabutyl ammonium m-chlorobenzoate, 2.4 ml of a 1.0 M solution in acetonitrile and THF, 10.9 g) was syringe pumped during both the monomer feeds. Monomer feed 1 (trimethylsilyl methacrylate 906 g (5.73 mol) and Benzyl methacrylate, 2752.3 g (15.63 mol)) was added over 60 minutes while the reaction exo-thermed to 65° C. After a 1 hr hold, HPLC indicated greater than 95% monomer conversion, and then, monomer feed II (ethyl triethylene glycol methacrylate, 1027.1 g (4.17 mol)) was added over 15 minutes.

The ETEGMA conversion was greater than 98% 90 min after the feed was complete. 400.34 g of methanol were added, and then the THF and other volatile by-products were distillated by slowly heating to 120° C. while adding 2-pyrrolidone (2P). The final polymer solution was 45.1% solids with a measured number of 85.2 mg KOH/gram of polymer solids. The molecular weight of this polymer as measured by GPC was Mn 8543, Mw 9568, and PD 1.12.

Dispersant 2: Diblock 8ETEGMA//30BMA/11MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 2423 g, was cannulated to the flask. Initiator (1,1-bis(trimethylsilyloxy)-2-methyl propene, 98.82 g (0.426 moles)) was injected followed by catalyst (tetrabutyl ammonium m-chlorobenzoate, 2.6 ml of a 1.0 M solution in acetonitrile). Catalyst solution (tetrabutyl ammonium m-chlorobenzoate, 2.1 ml of a 1.0 M solution in acetonitrile and THF, 16.1 g) was syringe pumped during both the monomer feeds. Monomer feed 1 (trimethylsilyl methacrylate 728.7 g (4.61 mol) and butyl methacrylate, 1790.9 g (12.61 mol)) was added over 60 minutes while the reaction exo-thermed to 65° C. After a 1 hr hold, HPLC indicated greater than 95% monomer conversion, and then, monomer feed II (ethyl triethylene glycol methacrylate, 825.3 g (3.35 mol)) was added over 15 minutes.

The ETEGMA conversion was greater than 98% 90 min after the feed was complete. 322.6 g of methanol were added, and then the THF and other volatile by-products were distillated by slowly heating to 120° C. while adding 2-pyrrolidone (2P). The final polymer solution was 45.1% solids with a measured number of 98.2 mg KOH/gram of polymer solids. The molecular weight of this polymer as measured by GPC was Mn 9018, Mw 9635, and PD 1.07.

Dispersant 3: Diblock 8ETEGMA//49BzMA/20MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 1046 g, was cannulated to the flask. Initiator (1,1-bis(trimethylsilyloxy)-2-methyl propene, 34.7 g (0.150 moles)) was injected followed by catalyst (tetrabutyl ammonium m-chlorobenzoate, 0.9 ml of a 1.0 M solution in acetonitrile). Catalyst solution (tetrabutyl ammonium m-chlorobenzoate, 0.7 ml of a 1.0 M solution in acetonitrile and THF, 3 g) was syringe pumped during both the monomer feeds. Monomer feed 1 (trimethylsilyl methacrylate 459.5 g (2.91 mol) and benzyl methacrylate, 1253.2 g (7.12 mol)) was added over 60 minutes while the reaction exo-thermed to 65° C. After a 1 hr hold, HPLC indicated greater than 95% monomer conversion, and then, monomer feed II (ethyl triethylene glycol methacrylate, 286 g (1.16 mol)) was added over 20 minutes.

After 1 hr relux, the ETEGMA conversion was greater than 97%. Then, 195 g of methanol were added, and THF and other volatile by-products were distillated by slowly heating to 120° C. while adding 2-pyrrolidone (2P). The final polymer solution was 41.3% solids with a measured number of 95.6 mg KOH/gram of polymer solids.

Comparative Dispersant 1: Random 22BzMA/11MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 902 g, was cannulated to the flask. Initiator (1,1-bis(trimethylsilyloxy)-2-methyl propene, 55 g (0.233 moles)) was injected followed by catalyst (tetrabutyl ammonium m-chlorobenzoate, 0.6 ml of a 1.0 M solution in acetonitrile). Catalyst solution (tetrabutyl ammonium m-chlorobenzoate, 0.6 ml of a 1.0 M solution in acetonitrile and THF, 29.0 g) was syringe pumped during both the monomer feeds. Monomer feed 1 (trimethylsilyl methacrylate 412 g (2.59 mol) and Benzyl methacrylate, 918 g (6.46 mol)) was added over 45 minutes while the reaction exo-thermed to 65° C. After a 1 hr hold, HPLC indicated greater than 98% monomer conversion, then 182.07 g of methanol were added. Then, the THF and other volatile by-products were distillated by slowly heating to 120° C. while adding 2-pyrrolidone (2P). The final polymer solution was 45.54% solids with a measured number of 132.7 mg KOH/gram of polymer solids.

Comparative Dispersant 2: Diblock 13BzMA//10MAA

A 5-liter round bottom flask was dried with a heat gun under nitrogen purge and equipped with a mechanical stirrer, thermocouple, $N_2$ inlet, drying tube outlet, and addition funnels. Tetrahydrofuran (THF), 802 g, was cannulated to the flask. Initiator (1,1-bis(trimethylsilyloxy)-2-methyl propene, 81.5 g (0.345 moles)) was injected followed by catalyst (tetrabutyl ammonium m-chlorobenzoate, 0.85 ml of a 1.0 M solution in acetonitrile). Catalyst solution (tetrabutyl ammonium m-chlorobenzoate, 0.85 ml of a 1.0 M solution in acetonitrile and THF, 7.35 g) was syringe pumped during the monomer feed. Monomer feed (trimethylsilyl methacrylate 554.9 g (3.53 mol), was added over 45 minutes while the reaction exo-thermed to 72° C. After a 1 hr hold, HPLC indicated greater than 97% monomer conversion, and then, monomer feed II Benzyl Methacrylate 803.5 g (5.10 mol), was added over 45 minutes. After a 60 min hold, HPLC indicated greater than 99% monomer conversion.

Then, 247.2 g of methanol were added, and THF and other volatile by-products were distillated by slowly heating to 120° C. while adding 2-pyrrolidone (2P). The final polymer solution was 40.55% solids with a measured number of 190.4 mg KOH/gram of polymer solids. The molecular weight of this polymer as measured by GPC was Mn 4638, Mw 5065, and PD 1.09.

Preparation of Pigmented Dispersions

The carbon black pigmented dispersions were prepared using Degussa's Nipex® 180 IQ carbon black pigment. Each carbon black premix was prepared at 23% pigment loading and the amount of dispersant was set at a P/D (pigment/dispersant) of 2.0 that corresponded to a 50% level of active dispersant on pigment. Neutralization of the dispersants was done using a 45.6% active KOH solution. The neutralization process was done "In Situ" in the Premix step for Pigment Dispersions 1.

Pigment Dispersion 1:

Pigment Dispersion1 was prepared using a two step process in which the dispersion ingredients were added to a 1 Liter stainless steel pot in the order shown below. The premix step used a High Shear Disperser, HSD, with a 60 mm Cowels blade operated at 3500 rpm which ran for 2 hours. The pigment dispersion milling was performed using a labscale model M-110Y High Pressure Pneumatic, Microfluidizer with a diamond Z-Chamber available from Microfluidics, a division of Microfluidics International Corporation, Newton, Mass. Pigment Dispersion 1 was processed at a pressure of 15,000 psi for a total of 12 passes through the Microfluidizer.

Step 1: Premix

A 2200 gram dispersion sample was prepared by adding the following ingredients, in the order listed below, to a 1 Liter stainless steel pot. Each ingredient was added slowly with mixing using an HSD, High Shear Disperser, equipped with a 60 mm Cowels blade and operated at roughly 1000 rpm during ingredient loading. The pigment loading in the premix step was 23%.

| Ingredients | Amount (g) |
| --- | --- |
| Deionized water | 741.05 |
| Dispersant 1 (BzMA/MAA//ETEGMA 30/11//8) | 340.56 |
| KOH Solution (45.6% Active) | 23.2 |
| Nipex ® 180 carbon black pigment | 330. |

After all ingredients were loaded, the High Speed Disperser speed was increased to 3500 rpm and the contents were processed for 2 hours. Next, additional deionized water (765 grams) was added to reduce the pigment level in the dispersion to 15% which is the level used in the Microfludization milling stage.

Step 2: Milling

The premix prepared in Step 1 was milled using a labscale model M-110Y High Pressure Pneumatic, Microfluidizer, with a diamond Z-Chamber from Microfluidics, Newton, Mass. The dispersion was milled for a total of 12 passes at a flow-rate of 440 ml/min and pressure of 15,000 psi. After milling was completed at 15% pigment, the dispersion was filtered through a 0.3 micron Chipwich filter available from Pall Trincor, East Falls, N.Y. and collected into a 3000 ml polyethylene container. The final pigment dispersion batch size totaled 2200 grams. The properties of pH, viscosity, particle size (D50 and D95 in nm) and Accusizer of the pigment dispersion were tested and are reported in Table 2.

Pigment Dispersion 2 (Magenta):

Pigment Dispersion 2 was made using a media milling process and a lab-scale Eiger Minimill, model M250, VSE EXP from Eiger Machinery Inc. Chicago, Ill. The first step comprised the mixing of all the ingredients, that is, pigment, dispersants, KOH, pH adjuster, to provide a blended "premix". All liquid ingredients were added first, followed by the KOH solution which was used to neutralize "in situ" the dispersant and lastly the pigment. Mixing was done in a stirred 10 Liter stainless steel mixing vessel using a high-speed disperser, (HSD), with a 60 mm Cowels type blade attached to the HSD operated at 3500 rpm for a total mixing time of 2 hrs.

The pigment loading in the premix step was 25%.

| Ingredients | Amount (g) |
| --- | --- |
| Deionized water | 460.49 |
| Dispersant 2 (BMA/MAA//ETEGMA 30/11//8) | 936.50 |
| KOH Solution (45.6% Active) | 56.90 |
| Pigment Red 122 (Sun chemical) | 1610.00 |

After premixing for 2 hrs. at 3500 rpm using the HSD, additional DI water was added to reduce pigment loading to 23% which gave the desired rheology and was the level used during the media milling stage.

| Ingredients | Amount (g) |
| --- | --- |
| Deionized water | 672.2 |

Next the media milling or grinding step was performed by charging 820 grams of 0.5 YTZ zirconia media to the mill. The dispersion was processed using a re-circulation grinding process with a mill disk speed of 3500 rpm and flow rate of 350 grams per min. The milling was done using a staged procedure in which 20% of the DI water was held out during the grind and added after milling was completed. The dispersion was processed for a total of 4 hours milling time.

After completion of the milling step the final letdown of DI water was added and mixed in reducing the pigment loading in the dispersion to 10%.

| Ingredients | Amount (g) |
| --- | --- |
| Deionized water (final letdown) | 1319.3 |

The pigment dispersion was filtered through a 0.3 micron Chipwich filter available from Pall Trincor of East Falls, N.Y. and collected into a 1000 ml polyethylene container. The final pigment dispersion batch size totaled 5366 grams at 13% pigment loading.

Pigment Dispersion Comparative Compostions 1 and 2 (Magenta):

Pigment Dispersion Comparative Compositions 1 and 2 were prepared by a process similar to the Eiger Minimill process described for Pigment Dispersion 2 with the following exception: Pigment Dispersion Comparative Composition 1 was Pigment Red 122 dispersed with Comparative Dispersant 1 (22/11 BzMA/MAA) at a P/D of 2. Pigment Dispersion Comparative Composition 2 was Pigment Red 122 dispersed with Comparative Dispersant 2 (13//10 BzMA//MAA).

Pigment Dispersion 3 (Yellow):

Pigment Dispersion 3 was prepared by a process similar to the Eiger Minimill process described for Pigment Dispersion 2 with the following exception: Pigment Yellow 74 (Sun Chemical) was dispersed with Dispersant 2 (8ETEGMA//30BMA/11MAA) at a P/D of 2.0.

Pigment Dispersion 4 (Yellow):

Pigment Dispersion 4 was prepared by a process similar to the Eiger Minimill process described for Pigment Dispersion 2 with the following exception: Pigment Yellow 74 (Sun Chemical)) was dispersed with Dispersant 3 (8ETEGMA//49BzMA/20MAA) at a P/D of 2.5.

TABLE 2

Initial Pigment Dispersion Properties at Room Temperature

| Dispersion no. | Dispersant | Pigment | pH | D50 | D95 | Accusizer ($\times 10^7$ counts/ml) |
| --- | --- | --- | --- | --- | --- | --- |
| 1 | Dispersant 1 8ETEGMA//30BzMA/11MAA | Nipex ® 180 | 8.54 | 104 | 183 | 16 |
| 2 | Dispersant 2 8ETEGMA//30BMA/11MAA | PR122 | 8.08 | 111 | 180 | 6 |
| 3 | Dispersant 2 8ETEGMA//30BMA/11MAA | Y74 | 8.03 | 116 | 193 | 7 |
| 4 | Dispersant 3 8ETEGMA//49BzMA/20MAA | Y74 | 8.10 | 111 | 254 | 200 |
| Comp1 | Comp dispersant 1 22BzMA/11MAA | PR122 | 8.24 | 96 | 165 | 23 |
| Comp2 | Comp dispersant 2 13BzMA//10MAA | PR122 | 7.3 | 96 | 168 | 3 |

Crosslinked Pigment Dispersion Preparation:

In the crosslinking step, crosslinking compound was mixed with the above pigment dispersion, and heated at 60°-80° C., with efficient stirring, for 6 to 8 hours. After crosslinking reaction was finished, pH was adjusted to at least about 8.0 if needed. Table 3 summarized the crosslinking recipe for the pigment dispersion crosslinking. Table 4 summarized the final crosslinked pigment dispersions physical properties. Since all crosslinked dispersions had pH above 8.0, no pH adjustment step was performed. As shown in Table 4, crosslinking had no negative impact on dispersion particle size and bigs.

TABLE 3

| Crosslinked Dispersion no. | Dispersion no. | Pigment | Crosslinking moiety | Crosslinking Compound | Mole ratio Crosslinker:COOH |
|---|---|---|---|---|---|
| XL-1A | 1 | Nipex ® 180 | COOH | Denacol 321 | 1:4 |
| XL-1B | 1 | Nipex ® 180 | COOH | Denacol 512 | 1:4 |
| XL-2 | 2 | PR122 | COOH | Denacol 321 | 2:5 |
| XL-3 | 3 | Y74 | COOH | Denacol 920 | 1:4 |
| XL-4 | 4 | Y74 | COOH | Denacol 321 | 1:4 |
| XL-Comp1 | Comp1 | PR122 | COOH | Denacol 321 | 1:4 |
| XL-Comp2 | Comp2 | PR122 | COOH | Denacol 321 | 1:4 |

TABLE 4

| Crosslinked Dispersion no. | pH | D50 | D95 | Accusizer ($\times 10^7$ counts) |
|---|---|---|---|---|
| XL-1A | 8.66 | 99 | 151 | 16 |
| XL-1B | 8.49 | 102 | 182 | 14 |
| XL-2 | 9.19 | 103 | 172 | 8 |
| XL-3 | 9.77 | 101 | 216 | 8 |
| XL-4 | 8.42 | 121 | 220 | NA |

TABLE 4-continued

| Crosslinked Dispersion no. | pH | D50 | D95 | Accusizer ($\times 10^7$ counts) |
|---|---|---|---|---|
| XL-Comp1 | 8.85 | 91 | 177 | 7 |
| XL-Comp2 | 8.09 | 103 | 170 | 10 |

Ink Preparation and Stability Testing:

Inks were prepared by stirring together the pigment dispersion and the vehicle ingredients listed in Table 5. The dispersion was added in an amount that provided 3% pigment solids in the final ink. Ink physical properties including viscosity, pH, particle size (D50) at room temperature were measured. To test ink stability, above physical properties were re-measured after heat aged at 60° C. for 7 days. Pigment particle size growth after dispersion was formulated into the ink and particle size growth after heated aging were indications of dispersion instability. Large increase of viscosity after heat aging was also the indication of dispersion instability. Stability of pigment dispersions before and after the crosslinking step was tested. Results were summarized in Table 6.

TABLE 5

| Vehicle Ingredient | |
|---|---|
| Butyl Cellosolve | 10.0% |
| Butyl Carbitol | 16.0% |
| 2-Pyrrolidone | 5.0% |
| Water | Balance |

TABLE 6

Ink Stability Results

| | Room Temperature | | | After 7-day at 60° C. | | | % Viscosity | % D50 |
|---|---|---|---|---|---|---|---|---|
| Dispersion no. | pH | Viscosity (cps) | D50 (nm) | pH | Viscosity | D50 (nm) | change | increas |
| 1 | 8.36 | 3.78 | 99.6 | 7.81 | 4.17 | 133.9 | 10.32% | 34% |
| XL-1A | 8.22 | 3.73 | 103.6 | 8.02 | 3.73 | 111 | 0.00% | 7% |
| XL-1B | 8.13 | 3.79 | 104.2 | 7.98 | 3.73 | 110.2 | −1.58% | 6% |
| 2 | 7.68 | gel | 97 | 7.76 | gel | 474 | NA | 389% |
| XL-2 | 8.85 | 5.3 | 99.3 | 8.57 | 6.03 | 121.1 | 13.77% | 22% |
| 3 | 7.98 | 3.94 | 89.5 | 7.80 | 4.41 | 243 | 11.93% | 172% |
| XL-3 | 8.96 | 5.26 | 129.5 | 8.62 | 5.01 | 144.5 | −4.75% | 12% |
| 4 | 7.29 | 3.09 | 100 | 7.16 | 4.82 | 1107 | 55.99% | 1007% |
| XL-4 | 7.51 | 3.29 | 96 | 7.36 | 2.85 | 129 | −13.37% | 34% |
| Comp1 | 8.09 | 8.05 | 466.0 | 8.63 | 4.45 | 555.0 | −44.72% | 19% |
| XL-comp1 | NA | NA | 89 | NA | NA | 232 | NA | 161% |
| Comp2 | 7.31 | 34.2 | 264.8 | 7.4 | gel | 272 | NA | 3% |
| XL-comp2 | 7.67 | 6.68 | 141.8 | 7.75 | 8.53 | 297.4 | 27.69% | 110% |

As shown in Table 6, crosslinked dispersions of this disclosure XL-1A, XL-1B, XL-2, XL-3, and XL-4 all demonstrated improved ink stability compared to non-crosslinked counterparts. For both comparative dispersions dispersed with non-inventive dispersants, crosslinked and non-crosslinked dispersions showed instability. Crosslinking of the comparative dispersions did not improve stability. In the case of comp1 and comp2 dispersions, although increases of particle size after heat aging were small, ink particle sizes at room temperature were already quite big when inks were initially made, an indication of instability.

What is claimed is:

1. An aqueous ink jet ink comprising an ink vehicle and an aqueous dispersion, wherein the aqueous dispersion comprises a solid particle and a polymeric dispersant that has been crosslinked, wherein the polymeric dispersant is a block copolymer comprising an A block and a B block, wherein the A block is a segment having a block size of about 5 to about 18 units, and comprises at least 50% by weight of a monomer, having the following structure:

$$CH_2=CRC(O)O(CHR_1CH_2O)nR_2$$

wherein R and $R_1$ are H, or methyl;
$R_2$ is alkyl of 1-4 carbon atoms or phenyl; and
n is about 1 about 20; and the B block is a segment comprising an ionic monomer and at least one hydrophobic monomer; and wherein the dispersant comprises a crosslinkable moiety; wherein the crosslinkable moiety is crosslinked with a crosslinking agent selected from the group consisting of epoxide, carbodiimide, oxazoline, isocyanate, and silane; and wherein the aqueous dispersion has a pH of at least about 8.0.

2. The aqueous ink jet ink of claim 1 wherein the solid particle is selected from the group consisting of a colorant, filler, metallic particle, biologically active compound, pharmaceutically active compound, polymer particle and hollow glass sphere.

3. The aqueous ink jet ink of claim 1 wherein the A block has a block size of about 6 to about 12 units.

4. The aqueous ink jet ink of claim 1 wherein the A block has about 60 to about 100% of the monomer having the specified formula.

5. The aqueous ink jet ink of claim 4 wherein the A block has about 80 to about 95% of the monomer having the specified formula.

6. The aqueous ink jet ink of claim 1 wherein the B block has a block size of about 15 to about 80 units.

7. The aqueous ink jet ink of claim 1 wherein the polymeric dispersant has a number average Molecular Weight (Mn) in the range of between about 2,000 to about 20,000 Daltons.

8. The aqueous ink jet ink of claim 1 wherein n is about 1 to about 10.

9. The aqueous ink jet ink of claim 1 wherein the polymeric dispersant has an acid number of about 40 to about 220 (mg KOH/g polymer solids).

10. The aqueous ink jet ink of claim 1 wherein the A block monomer is selected from the group consisting of ethoxy triethylene glycol methacrylate, n-butoxyethyl methacrylate, and mixtures thereof.

11. The aqueous ink jet ink of claim 1 wherein the A block further comprises monomers selected from the group consisting of hydroxyethylmethacrylate, methyl methacrylate, methacrylic acid, butyl methacrylate, and 2-dimethylaminoethyl methacrylate.

12. The aqueous ink jet ink of claim 1 wherein the B block comprises a hydrophobic monomer having the formula:

$$R_3R_4C=R_5X$$

wherein $R_3$-$R_5$ are independently selected from the group consisting of H, alkyl, aryl and alkylaryl of 1 to 20 carbon atoms, and
X is a hydrophobic group.

13. The aqueous ink jet ink of claim 12 wherein X is selected from the group consisting of:
(a) an alkyl, aryl and alkylaryl group containing 1-20 carbon atoms;
(b) a group of the formula $C(O)OR_6$, wherein $R_6$ is selected from the group consisting of an alkyl, aryl and alkylaryl group containing 1-20 carbon atoms; and
(c) a group of the formula $C(O)NR_7R_8$, wherein each of $R_7$ and $R_8$ is independently selected from the group consisting of H and an alkyl, aryl and alkylaryl group containing 1-20 carbon atoms.

14. The aqueous ink jet ink of claim 13 wherein (a), (b) or (c) further comprises one or more heteroatoms.

15. The aqueous ink jet ink of claim 12 wherein the hydrophobic monomer is selected from the group consisting of benzyl methacrylate, butyl methacrylate, methyl methacrylate, ethyl methacrylate, propyl methacrylate, hexyl methacrylate, 2-ethylhexyl methacrylate, octyl methacrylate, lauryl ethacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, acrylonitrile, glycidyl acrylate, p-tolyl acrylate, sorbyl acrylate, styrene, alpha-methyl styrene, substituted styrenes, N-alkyl acrylamides, N-alkyl methacrylamides, vinyl acetate, vinyl butyrate and vinyl benzoate.

16. The aqueous ink jet ink of claim 1 wherein the ionic monomer has the formula:

$$R_9R_{10}C=R_{11}Z$$

wherein each of $R_9$ - $R_{11}$ are independently selected from the group consisting of H and an alkyl, aryl or alkylaryl group having 1-20 carbons, and wherein Z is at least one ionic or a potentially ionic monomer.

17. The aqueous ink jet ink of claim 16 wherein Z is anionic, cationic, amphoteric or zwitterionic.

18. The ink jet ink of claim 17 wherein Z comprises an anionic group selected from the group consisting of sulfonates, sulfate, sulfosuccinate, carboxylate, and phosphate.

19. The aqueous ink jet ink of claim 1 wherein the crosslinkable moiety is selected from the group consisting of acid, hydroxyl and mixtures thereof.

20. A printer comprising an aqueous ink jet ink wherein the aqueous ink jet ink comprises an ink vehicle and an aqueous dispersion, wherein the aqueous dispersion comprises a solid particle and a polymeric dispersant that has been crosslinked, wherein the polymeric dispersant is a block copolymer comprising an A block and a B block, wherein the A block is a segment having a block size of about 5 to about 18 units, and comprises at least 50% by weight of a monomer, having the following structure:

$$CH_2=CRC(O)O(CHR_1 CH_2O)n R_2$$

wherein R and $R_1$ are H, or methyl;
$R_2$ is alkyl of 1-4 carbon atoms or phenyl; and
n is about 1 about 20; and the B block is a segment comprising an ionic monomer and at least one hydrophobic monomer; and wherein the dispersant comprises a crosslinkable moiety; wherein the crosslinkable moiety is crosslinked with a crosslinking agent selected from the group consisting of epoxide, carbodiimide, oxazoline, isocyanate, and silane; and wherein the aqueous dispersion has a pH of at least about 8.0.

* * * * *